(12) United States Patent
Paradise et al.

(10) Patent No.: US 10,307,674 B2
(45) Date of Patent: Jun. 4, 2019

(54) ONLINE SOFTWARE VIDEO CAPTURE AND REPLAY SYSTEM

(71) Applicant: Skillz Inc., San Francisco, CA (US)

(72) Inventors: Andrew Paradise, Boston, MA (US); James Daniels, Boston, MA (US); Jason Petralia, Winchester, MA (US)

(73) Assignee: Skillz Inc, San Francisco, CA (US)

( * ) Notice: Subject to any disclaimer, the term of this patent is extended or adjusted under 35 U.S.C. 154(b) by 118 days.

(21) Appl. No.: 15/494,776

(22) Filed: Apr. 24, 2017

(65) Prior Publication Data

US 2017/0225075 A1 Aug. 10, 2017

Related U.S. Application Data

(63) Continuation of application No. 14/224,889, filed on Mar. 25, 2014, now Pat. No. 9,630,097.

(60) Provisional application No. 61/930,406, filed on Jan. 22, 2014.

(51) Int. Cl.
| | |
|---|---|
| *A63F 13/30* | (2014.01) |
| *A63F 13/497* | (2014.01) |
| *A63F 13/355* | (2014.01) |
| *A63F 13/49* | (2014.01) |
| *A63F 13/352* | (2014.01) |

(52) U.S. Cl.
CPC ............ *A63F 13/497* (2014.09); *A63F 13/12* (2013.01); *A63F 13/30* (2014.09); *A63F 13/352* (2014.09); *A63F 13/355* (2014.09); *A63F 13/49* (2014.09); *A63F 2300/634* (2013.01)

(58) Field of Classification Search
CPC .............................. A63F 13/13; G07F 17/3276
See application file for complete search history.

(56) References Cited

U.S. PATENT DOCUMENTS

| | | | |
|---|---|---|---|
| 6,699,127 B1 * | 3/2004 | Lobb ....................... | A63F 13/10 345/418 |
| 9,630,097 B2 | 4/2017 | Paradise et al. | |
| 2008/0161113 A1 | 7/2008 | Hansen et al. | |
| 2009/0131177 A1 * | 5/2009 | Pearce .................... | A63F 13/10 463/43 |
| 2009/0208181 A1 * | 8/2009 | Cottrell ................ | G11B 27/034 386/278 |
| 2010/0241699 A1 | 9/2010 | Muthukumarasamy et al. | |
| 2010/0304860 A1 | 12/2010 | Gault et al. | |

(Continued)

*Primary Examiner* — James S. McClellan
*Assistant Examiner* — Kevin M Carter
(74) *Attorney, Agent, or Firm* — Mintz Levin Cohn Ferris Glovsky and Pepeo, P.C.

(57) ABSTRACT

A user-activity video signal can be received. The user-activity video signal can comprise a video capture characterizing a user's interaction with a software application on a client. The software application can have an interface display space on the client and the software application can execute on the client in operation with at least one remote backend computing system. Backend user interaction data corresponding to the user's interaction with the software application as generated by the at least one remote backend computing system can be received. A new video comprising a plurality of divided segments of the user-activity video signal can be generated automatically using the backend user interaction data and a plurality of predefined rules. The new video can be provided. Related apparatus, systems, techniques, and articles are also described.

26 Claims, 6 Drawing Sheets

(56) References Cited

U.S. PATENT DOCUMENTS

| | | |
|---|---|---|
| 2011/0010386 A1 | 1/2011 | Zeinfeld |
| 2011/0072056 A1 | 3/2011 | Bakalash et al. |
| 2012/0013622 A1 | 1/2012 | Mahajan et al. |
| 2012/0156668 A1 | 6/2012 | Zelin |
| 2012/0281080 A1 | 11/2012 | Wang |
| 2013/0121614 A1 | 5/2013 | Intwala |
| 2013/0151614 A1 | 6/2013 | Beerse et al. |
| 2013/0172086 A1 | 7/2013 | Ikenaga |
| 2013/0226983 A1* | 8/2013 | Beining ............... H04N 21/252 709/201 |
| 2013/0339473 A1 | 12/2013 | McCaffrey et al. |
| 2013/0344960 A1 | 12/2013 | Perry et al. |
| 2015/0024839 A1* | 1/2015 | Zahn ................. H04N 21/4781 463/31 |
| 2015/0202529 A1 | 7/2015 | Paradise et al. |

* cited by examiner

ONLINE SOFTWARE VIDEO CAPTURE AND REPLAY SYSTEM

RELATED APPLICATIONS

This application is a continuation of and claims priority under 35 U.S.C. § 120 to U.S. application Ser. No. 14/224,889 filed Mar. 25, 2014, which claims the benefit of priority under 35 U.S.C § 119(e) to U.S. Provisional Patent Application No. 61/930,406, filed Jan. 22, 2014. Each of these applications is hereby incorporated herein by reference in their entirety.

TECHNICAL FIELD

The subject matter described herein relates to capturing, storing, modifying, and retrieving video content related to user activity in a software application.

BACKGROUND

While it is common for video games to be designed with the experience of the player in game being the only priority, many successful electronic sports (eSports) games are being designed to be played professionally. Video game genres associated with electronic sports can include but are not limited to real-time strategy, fighting, first-person shooter, and multiplayer online battle tournaments. In addition to allowing players to participate a given game, many game developers have added dedicated observing features for the benefit of spectators and competitors. This typically can consist of simply allowing players to watch the game unfold through an online video stream of gameplay.

SUMMARY

In an aspect, a user-activity video signal can be received. The user-activity video signal can comprise a video capture characterizing a user's interaction with a software application on a client. The software application can have an interface display space on the client and the software application can execute on the client in operation with at least one remote backend computing system. Backend user interaction data corresponding to the user's interaction with the software application as generated by the at least one remote backend computing system can be received. A new video comprising a plurality of divided segments of the user-activity video signal can be generated automatically using the backend user interaction data and a plurality of predefined rules. The new video can be provided.

In another aspect, a system can include a video stream server and a replay server. The video stream server can receive from each of one or more clients a user-activity video signal comprising a video capture characterizing a user's interaction with a software application on the client. The software application can have an interface display space on the client and the software application can be executing on the client in operation with at least one remote backend computing system. The replay server can receive data characterizing backend user interaction data corresponding to the user's interaction with the software application as generated by the at least one remote backend computing system. The replay server can generate automatically, using the backend user interaction data and a plurality of predefined rules, dynamic commands for instructing the video stream server to create a new video comprising a plurality of divided segments of the user-activity video signals.

One or more of the following can be included. For example, events of interest can be detected from the backend user interaction data. The divided segments of the user-activity video signals can correlate in time to the events of interest. The new video can be generated substantially contemporaneously with reception of the user-activity video signal. The interface display space can include a user interface of an online multiplayer video game. The user-activity video signal can be created at the client by one or more of: capturing user interface screen shots at a predetermined rate; capturing open graphics library (openGL) layers; and capturing data through a pixel buffer and forming video data from the captured data. Providing can include one or more of storing, streaming, and displaying. A user-activity video signal can be received from each of a plurality of clients. The new video can be a composition of divided segments of video signals from a plurality of clients.

The replay server can detect events of interest from the backend user interaction data. The dynamic commands can be generated substantially contemporaneously with reception by the video stream server of the user-activity video signals. The dynamic commands can specify which divided segments of the user-activity video signals to include in the new video. The interface display space can include a user interface of an online multiplayer video game. The backend user interaction data can include one or more of: user identification, in-game player information, player history, and in-game player characteristics. The video stream server can store each received user-activity video signal and the new video. The video stream server can broadcast to one or more third party destinations the received user-activity video signals as the user-activity video signals are being received by the video stream server. Each of the user-activity video signals can be created at the respective client by one or more of: capturing user interface screen shots at a predetermined rate; capturing open graphics library (openGL) layers; and capturing data through a pixel buffer and forming video data from the captured data.

Computer program products are also described that comprise non-transitory computer readable media storing instructions, which when executed by at least one data processors of one or more computing systems, causes at least one data processor to perform operations herein. Similarly, computer systems are also described that may include one or more data processors and a memory coupled to the one or more data processors. The memory may temporarily or permanently store instructions that cause at least one processor to perform one or more of the operations described herein. In addition, methods can be implemented by one or more data processors either within a single computing system or distributed among two or more computing systems.

The subject matter described herein provides many advantages. For example, the current subject matter can enable improved viewing, monitoring, and/or analysis of user-activity on a client. The current subject matter can enable gathering, usage, management, categorization, reuse, and modification of potentially large quantities of user-activity video and associated data. Additionally, the current subject matter can enable cheating prevention, fraud prevention, competitive oversight, security augmentation, increased visibility, advertising, sponsorship opportunities, video editing, video reuse, data collection, data analysis, education, and spectator based entertainment.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Figure 1:
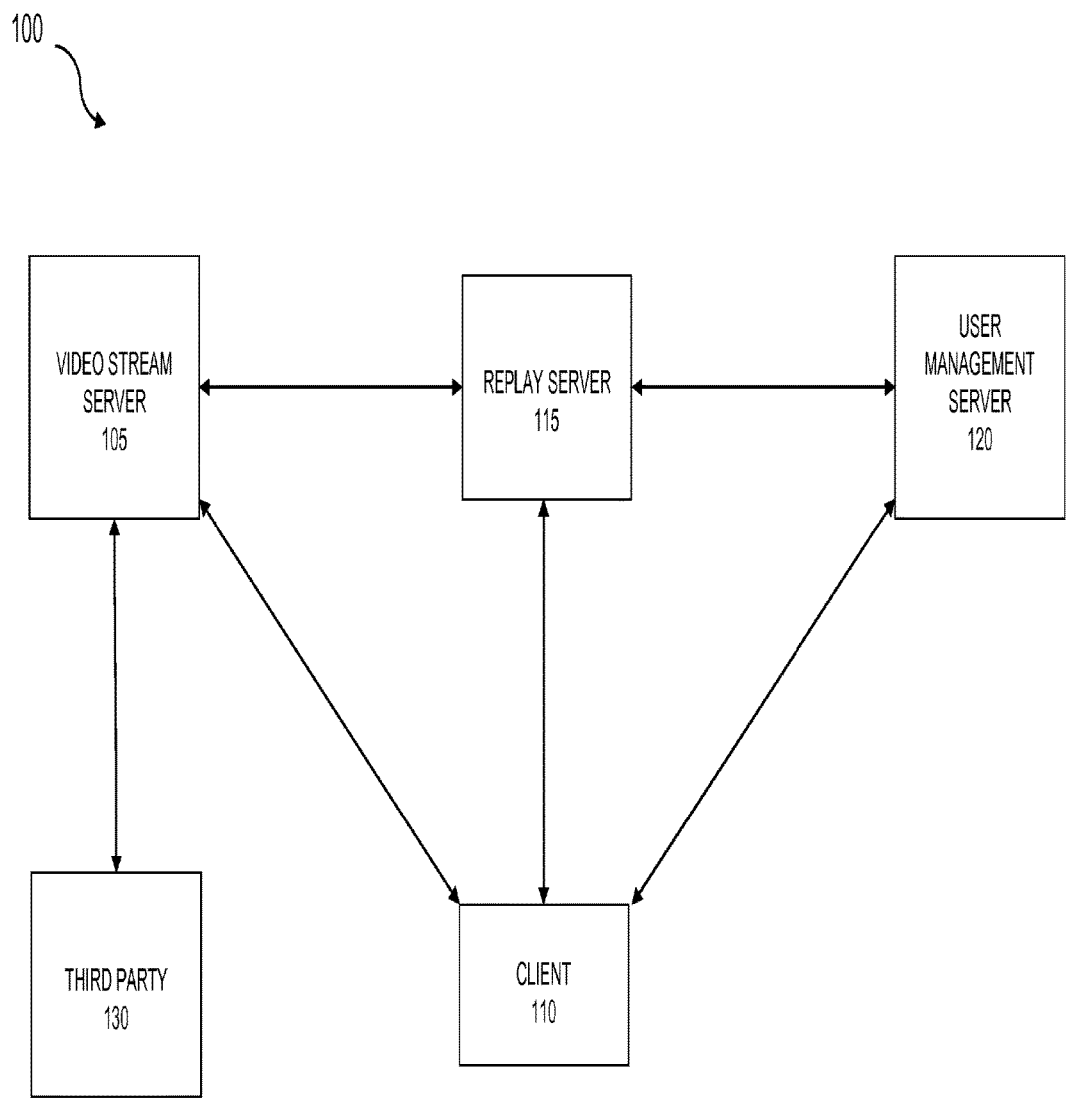
FIG. 1 is a system diagram illustrating an example implementation of an online software video replay system.

FIG. 1 is a system diagram illustrating an example implementation of an online software video replay system (and sometimes referred to herein as "OSVRS") 100. OSVRS 100 can include a video stream server 105 in communication with one or more clients 110 and a replay server 115. The clients 110 and the replay server 115 can be in communication with a user management server 120. The client's 110 can include a software application 125 with a user interface. In some example implementations, the software application 125 can include an online multiple player video game application in which users compete in tournaments against one another.

In some example implementations, OSVRS 100 can facilitate capture of video of activity in a software interface display space; enable processing, streaming, and storing of the captured video; and support retrieval, usage, and sharing of video content within an online system. OSVRS 100 can also automatically generate new video content from the previously captured video based at least on backend user interaction data related to the user activity, for example, automatically creating a "highlights" video of users' play in an online multiplayer video game. In some implementations the received user-activity video signal or the new video content can be rebroadcast to one or more third party destinations 130 as the user-activity video signals are being received or as the new video content is created. The rebroadcasting can be for viewing or other processing.

The video stream server 105 can be configured to receive from one or more clients 110 a user-activity video signal or video stream related to activity of the user on the respective client 110. The user-activity video signal can include a video capture of a user interface display space. For example, screen shots of a graphical user interface and any images displayed therein can be captured at an appropriate rate and streamed to the video stream server 105. The user-activity video signal can also include metadata related to the video capture such as time of capture, user identification, software identification, location based data, user input, hardware identification, and the like. The video stream server 105 can store and archive the received user-activity video signals and serve as a repository of previously received or currently received user-activity video signals.

The user management server 120 can manage and perform functionalities related to software application 125. For example, if software application 125 is an online multiple player video game, the user management server 120 can manage game-specific data, traffic, and other game related activities (e.g., a game hosting server). The user management server 120 can track a user's access or use of electronic resources for security purposes. For example, if software application 125 is an online consumer banking application, the user management server 120 can manage transaction specific data, traffic, and other related user interactions. The user management server 120 can generate or monitor backend user interaction data that is specific to, corresponding to, and/or relevant to the software application 125 such as actions taken by the user or events occurring in an instance of the software application 125. The backend user interaction data can include contextual information related to activity taken by a user in the software application 125. In the example implementation in which the software application 125 is an online multiple player video game, backend user interaction data can include player identity; player history; transaction history; and in-game characteristics such as score, range of scores, timing of scoring, opponent kills, and the like. The user management server 120 can be a remote backend server. The user management server 120 can send the backend user interaction data to the replay server 115.

The replay server 115 can receive the backend user interaction data from the user management server 120. The replay server 115 can also be in communication with the video stream server 105 and can receive the video signal metadata from the video stream server 105. The replay server 115 can monitor the state of the video stream server 105 with respect to each user-activity video signal. For example, the state of the video stream server 105 with respect to each user-activity video signal can include whether the user-activity is initializing, on-going, finished, real-time rebroadcasting (or live), retroactive viewing, editing, and the like. The replay server 115 can also include a plurality of predefined rules such as a rule set, which can be applied to the backend user interaction data, the state of the video stream server 105, and the video metadata, to automatically generate commands for instructing the video stream server 105 to create new content (e.g., a new video) from the user-activity video signals. The rule set can define what the new content should be comprised of.

In some example implementations, a rules or inference engine can be included and used by the replay server 115 for automatically generating commands for instructing the video stream server 105 to create a new video. A rules engine can operate by executing a cycle of matching, selecting, and executing rules until there are no more rules to execute. Rule engines can be state-based and can implement complex behaviors as a result of chaining individual rules. Rules may not be executed sequentially and it may not always be possible to determine through inspection of a set of rules which rule will be executed first.

In some implementations, the replay server 115 can generate the commands substantially contemporaneously with, or in substantially real-time with, the reception of backend user interaction data and video metadata. In other implementations, the replay server 115 can generate the commands for a user-activity video signal previously stored on the video stream server 105. The generation of commands using, for example, a state-based rules engine, can result in dynamic commands, which change over time as different backend user interaction data and video metadata is received and/or processed by the rules engine. In other words, the generation of commands can be noncausal (e.g., the commands have some dependence on backend user interaction data values from the future). For example, a segment of a user-activity signal may not be determined to be included in the new video until an occurrence of a later detectable event. The dynamic commands can specify which portions or divided segments of the user-activity video signals to include in the new video.

The replay server 115 can transmit the generated commands to the video stream server 105. The video stream server 105 can, based on the commands, generate the new content or video. The new content can be broadcast, viewed, stored, and the like, by the video stream server 105.

The new content or new video can comprise divided segments of video signals from multiple clients. For example, the segments can be combined in parallel such that two video signals are displayed concurrently in time (e.g., the new video includes two side-by-side and simultaneous user-activity videos), which can enable user-activity comparison between two or more users. As another example, the segments can be combined in serial such that a segment of a video signal from a first client is displayed, followed by a segment of a video signal from a second client.

Figure 2A:
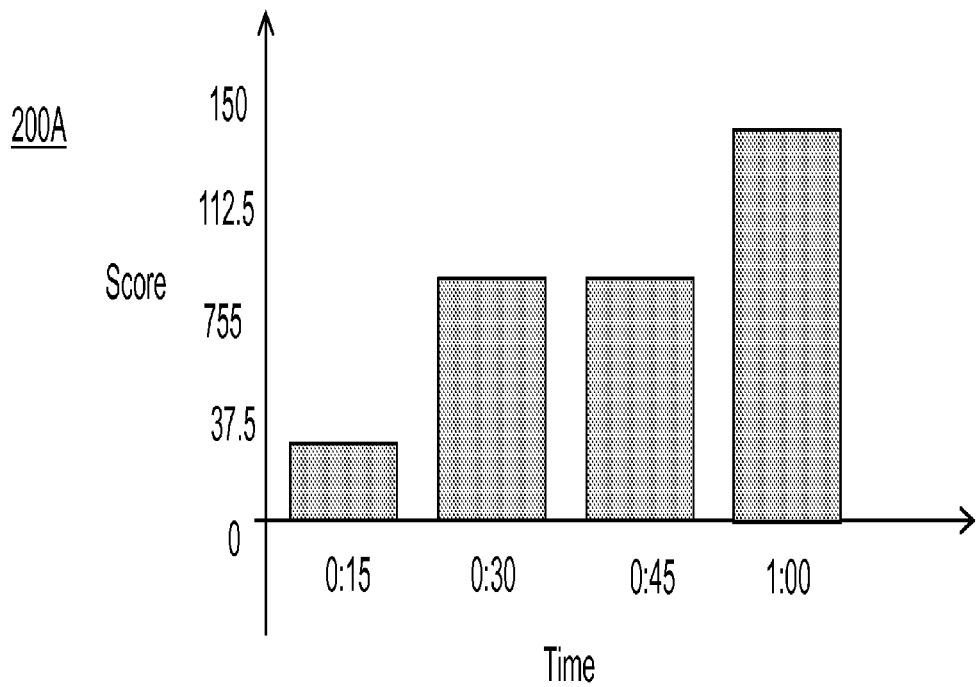
FIG. 2A is a graph of in-game score over time.
Figure 2B:
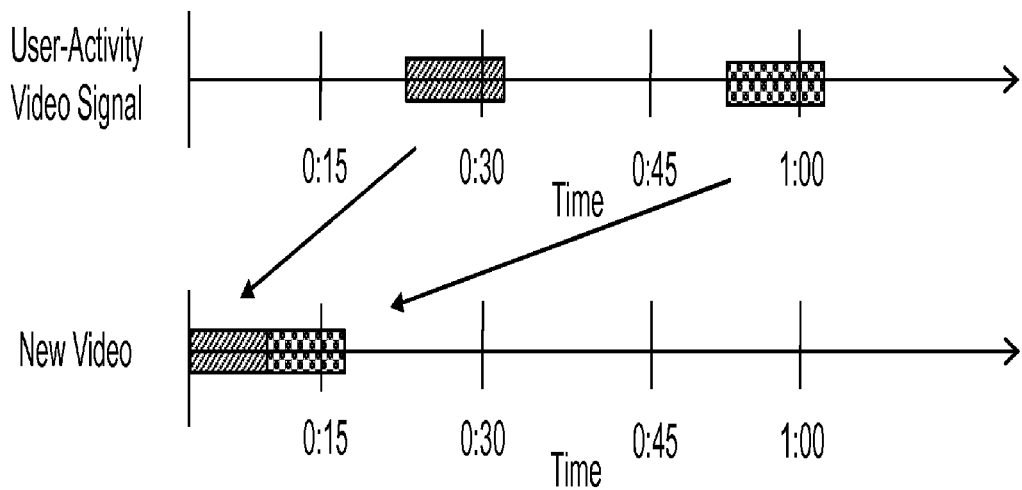
FIG. 2B is a line plot illustrating an example sampling of a user-activity video signal at user-activity events of interest to create automatically generated content.

In some implementations, the replay server 115 can, using the predefined rules, backend user interaction data, and/or the video metadata, detect user-activity events of interest, which can include detectable changes in video metadata, video stream server 105 state, and/or backend user interaction data. For example, a detectable event of interest in an online game application can include a change of in-game score. FIG. 2A is a graph 200A of in-game score over time. In the example of FIG. 2A, a change of in-game score occurred at 30 seconds and 1 minute into the video capture. The replay server 115 can detect the change in score. The generated commands can cause the new video to include samples or portions of the user-activity video signal correlating in time to the detected events of interest. FIG. 2B is a line plot 200B illustrating an example sampling of a user-activity video signal at user-activity events of interest to create automatically generated content. The new video includes the eight seconds prior to and including each change in score (more particularly, at 30 seconds and one minute). The commands can be used to generate a highlights video of gameplay that includes video showing user-activity proximal in time to changes of game score.

In some implementations, the replay server 115 can generate commands that cause the new video to include a specific user-activity video signal based on a priority. The priority can be determined from the backend user interaction data and/or the video metadata. For example, new video or content being rebroadcast substantially in real-time can, for a given moment in time, include the user-activity video signal from a player in an online tournament having the highest score, the most money won, the most damage to opponents, and the like.

The video stream server 105 can, for each received user-activity signal and created new video, provide a uniform resource locator (URL). The URL can be used to provide for distribution and rebroadcasting of the content. Furthermore, the video stream server 105 can index stored videos according to the URL and using a scheme involving user identity. Such indexing allows searching of the stored video content based on user identity.

Figure 3:
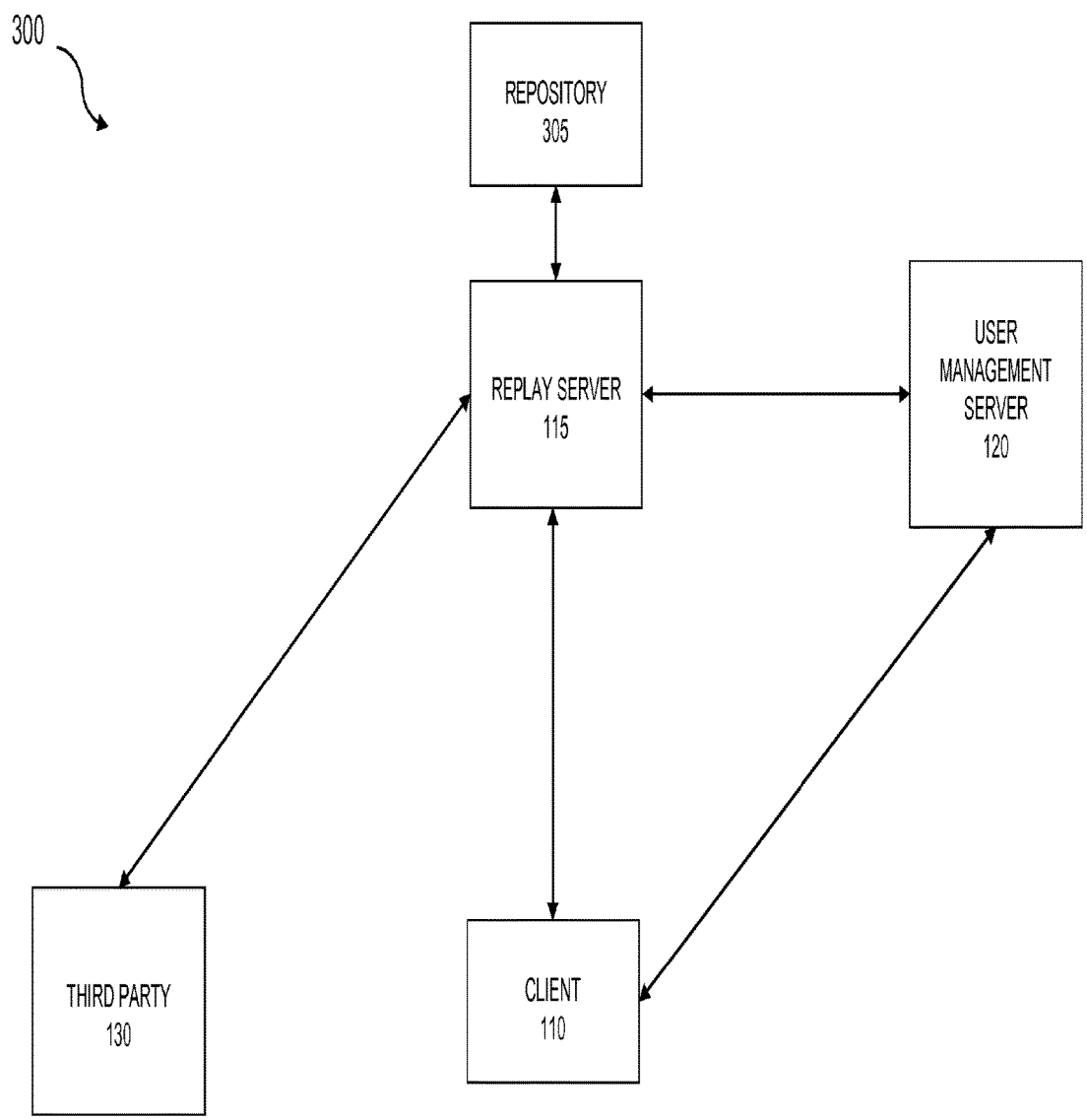
FIG. 3 is a system diagram of another example implementation of an online software video replay system.

FIG. 3 is a system diagram of another example implementation of an OSVRS system. In the example implementation of FIG. 3, the functionality of the video stream server 105 is performed by the replay server 115 having access to a repository 305 for storing received user-activity video signals and new videos.

Figure 4:
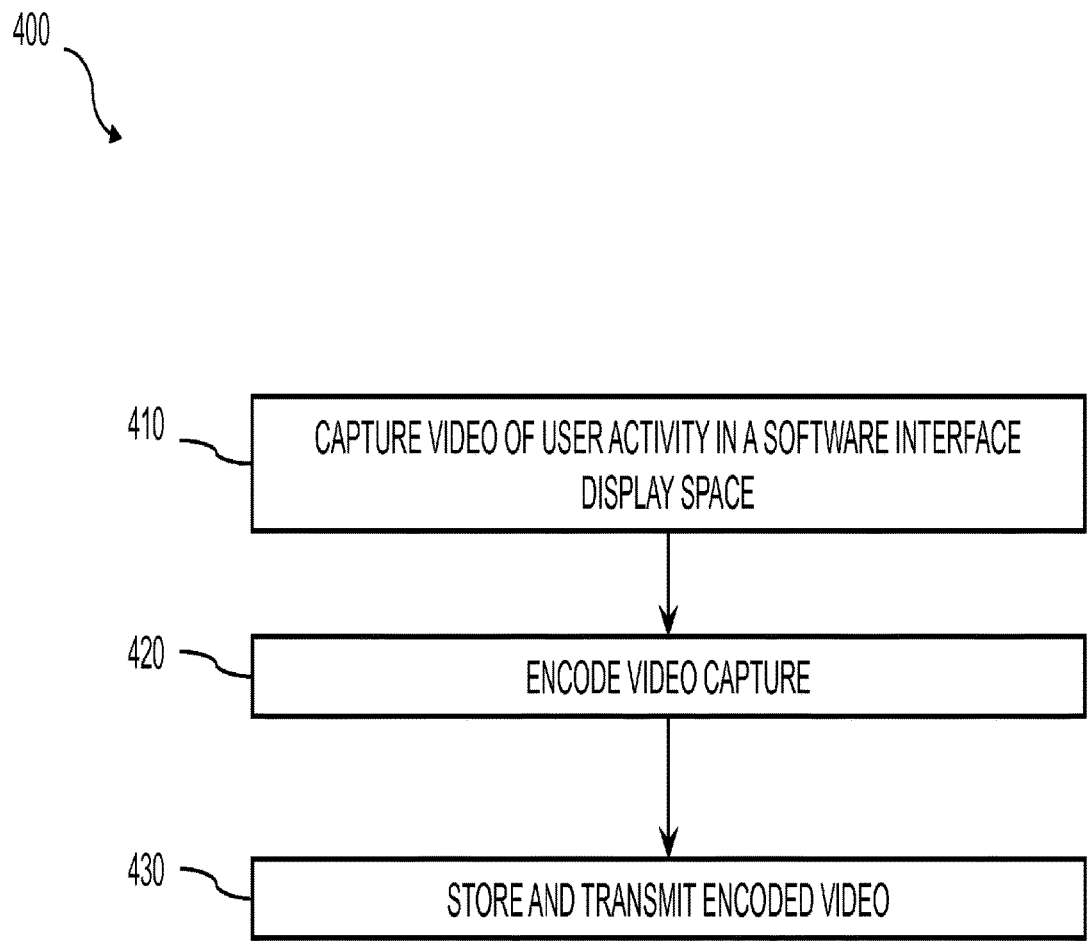
FIG. 4 is a process flow diagram of a process for video recording of activity in a software interface display space.

FIG. 4 is a process flow diagram 400 of a process for video recording of activity in a software interface display space. Video is captured at 405. Video capture can be performed by, for example, capturing user-interface display space views through screenshots at a predetermined rate or frames per second. Another example can include capturing open graphics library (openGL) layers. Yet another example can include capturing data in a pixel buffer and forming video data from the captured data. Other implementations are possible.

Encoding can be performed at 410. Encoding can compress the captured video and occurs at the client 110, using, for example, hardware acceleration. Other encoding implementations are possible.

Figure 5:
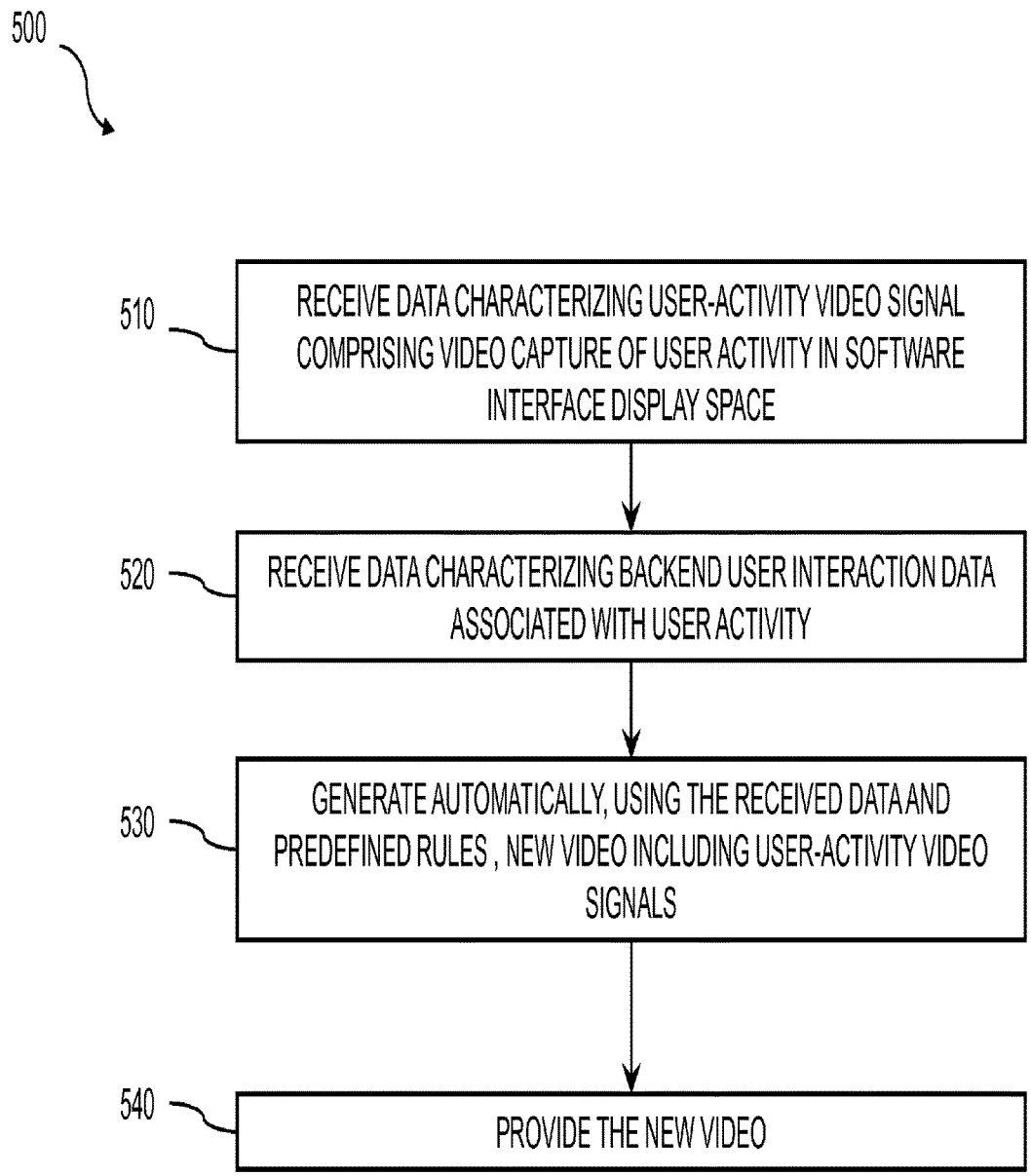
FIG. 5 is a process flow diagram of an example method for automatically generating a new video.

The encoded video can, at 415, be placed into temporary files on the client 110. A watcher function can monitor temporary file size and once a temporary file has reached a predetermined size, the temporary files can be transmitted by the watcher function to the video stream server 105. The watcher function can optimize the speed and efficiency of data transmission. FIG. 5 is a process flow diagram 500 of an example method for automatically generating a new video. A user-activity video signal can be received at 510 from one or more clients 110. The user-activity video signal can include a video capture of user activity in a software interface display space on a client 110.

Backend user interaction data associated with the user activity can be received at 520. The backend user interaction data can include, for example, contextual information related to activity taken by a user in a software application 125 on the client 110. In the example implementation in which the software application 125 is an online multiple player video game, backend user interaction data can include player identity; player history; and in-game characteristics such as score, timing of scoring, opponent kills, and the like.

Using the backend user interaction data and predefined rules, a new video can be generated automatically at 530. The new video can include at least a divided segment of the one or more user-activity video signals.

The new video can be provided at 540. Providing can include, for example, storing, streaming, broadcasting, processing, and displaying.

Figure 6:
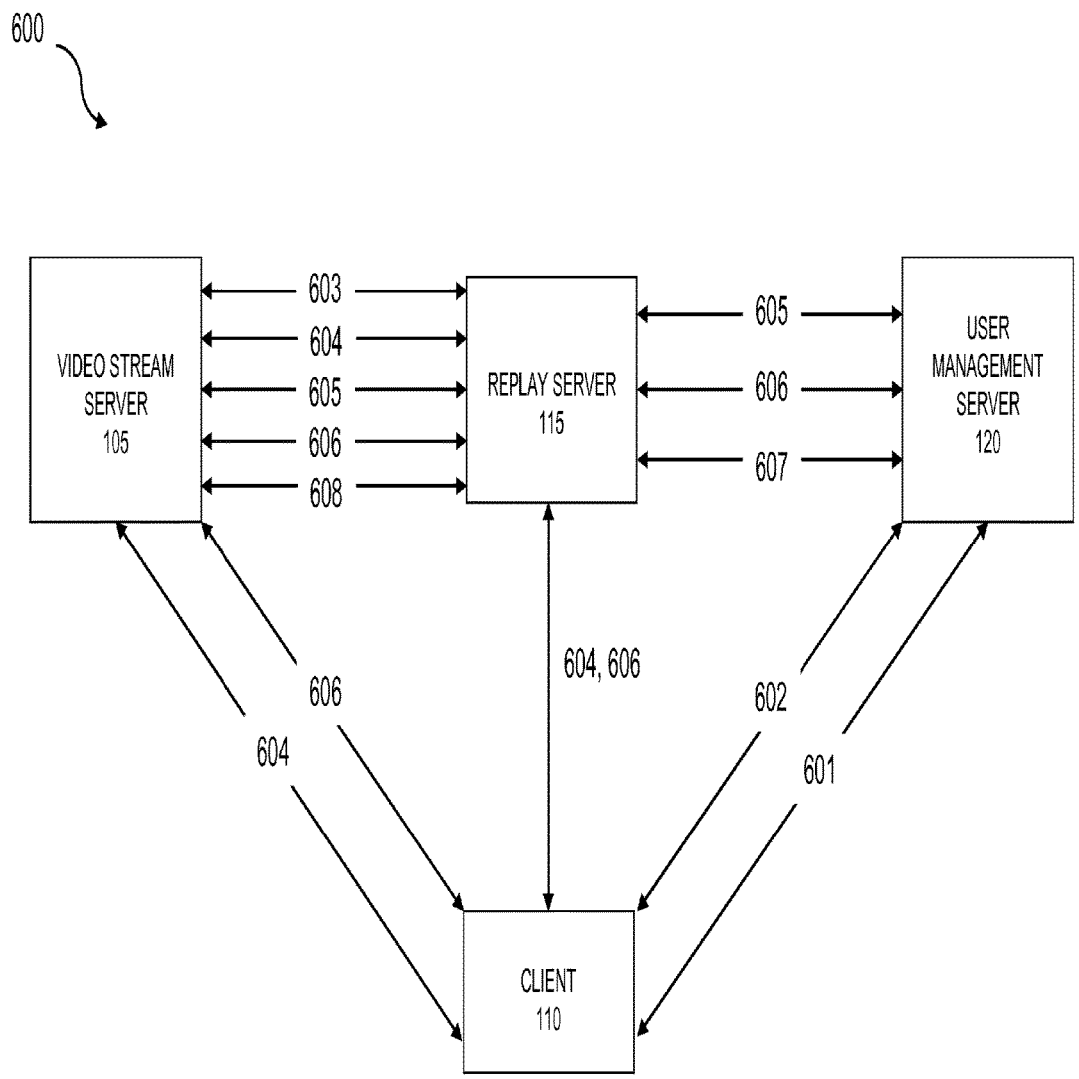
FIG. 6 is a system block diagram illustrating data flow for capturing, storing, modifying, and retrieving video content for a user enrolling in an online multiplayer video game tournament.

FIG. 6 is a system block diagram illustrating data flow for capturing, storing, modifying, and retrieving video content for a user enrolling in an online multiplayer video game tournament. At 601, a player enters an online or other computer implemented game provided by the user management server 120 (e.g., a game hosting server). The client 110 at 602 notifies the user management server 120 and the replay server 115 that a game has been initiated. The replay server 115 at 603 provides streaming credentials to client 110 and video stream server 105. The client 110 and video stream server 105 can at 604 initiate the user-activity video signal stream. Additionally, the video stream server 105 can notify the replay server 115 that a video stream session has begun and provide a URL. The replay server 115 at 605 can monitor the state of the video stream and report the state to the user management server 120. The user management server 120 can provide backend user interaction data related to the video game to the replay server 115 such as the score of each player enrolled in the tournament and their identities.

The replay server 115 can, at 606, begin to generate dynamic commands for generating new content (for example, as described with respect to FIG. 5). Alternatively, the user management server 120 can notify the replay server 115 at 607 when the tournament has completed and the video stream between the client 110 and the video stream server 105 (or, e.g., game tournament) can complete prior to generation of the dynamic commands. The dynamic commands can be transmitted to the video stream server 105 for generation of a new video. The video stream server 105 can generate the new video or content and provide a URL to the replay server 115.

In some implementations, a user, having entered and participated in the online gaming competition, can access both the entire user-activity video signal (for example, to review gameplay), or an automatically generated highlights video of the online gaming competition.

The current subject matter can be used for a number of applications. For example, the current subject matter can be applied towards video game players that are competing in a multiplayer online gaming environment. The current subject matter can be used for cheating and fraud prevention. For example, when backend user interaction data indicates suspicious user activity, a new video can be automatically generated showing the user's suspicious activity and a game or system administrator can review the generated video. Additional uses for the current subject matter can include fraud prevention; competitive oversight; security augmentation; increased visibility; advertising; sponsorship opportunities; video editing and reuse; data collection and analysis; and education and spectator based entertainment.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the implementations described above can be directed to various combinations and subcombinations of the disclosed features and/or combinations and subcombinations of several further features disclosed above. In addition, the logic flows depicted in the accompanying figures and described herein do not require the particular order shown, or sequential order, to achieve desirable results. Other embodiments may be within the scope of the following claims.

What is claimed is:

1. A method for implementation by one or more data processors forming part of at least one computing system, the method comprising:
  receiving, by a stream server, a user-activity video signal comprising a video capture characterizing a user's interaction with a software application on a client, the software application having an interface display space on the client and the software application executing on the client in operation with at least one remote backend computing system;
  receiving, by a replay server, backend user interaction data corresponding to the user's interaction with the software application as generated by the at least one remote backend computing system;
  detecting, by the replay server, user-activity events of interest;
  generating a new video automatically, the new video comprising a plurality of divided segments of the user-activity video signal, the generating performed at least by the stream server and using the backend user interaction data, the user-activity events of interest, a state of the stream server with respect to the user-activity video signal, and a plurality of predefined rules, the new video comprising a plurality of divided segments of the user-activity video signal; and
  providing the new video;
  wherein the state of the stream server with respect to the user-activity video signal includes initializing, on-going, finished, real-time rebroadcast, retroactive viewing, and editing, and wherein the stream server and the replay server comprise at least one data processor forming part of at least one computing system, and wherein the interface display space comprises a user interface of an online multiplayer video game.

2. The method of claim 1, further comprising detecting events of interest from the backend user interaction data; and wherein the divided segments of the user-activity video signals correlate in time to the events of interest.

3. The method of claim 1, wherein the new video is generated substantially contemporaneously with reception of the user-activity video signal.

4. The method of claim 1, wherein the user-activity video signal is created at the client by one or more of: capturing user interface screen shots at a predetermined rate; capturing open graphics library (openGL) layers; and capturing data through a pixel buffer and forming video data from the captured data.

5. The method of claim 1, wherein providing includes one or more of storing, streaming, and displaying.

6. The method of claim 1, wherein a user-activity video signal is received from each of a plurality of clients.

7. A non-transitory computer program product storing instructions, which when executed by at least one data processor of at least one computing system, implement a method comprising:
receiving, by a stream server and from each of one or more clients, a user-activity video signal comprising a video capture characterizing a user's interaction with a software application on a client, the software application having an interface display space on the client and the software application executing on the client in operation with at least one remote backend computing system;
receiving, by a replay server, data characterizing backend user interaction data corresponding to the user's interaction with the software application as generated by the at least one remote backend computing system;
detecting, by the replay server, user-activity events of interest;
generating a new video automatically, the new video comprising a plurality of divided segments of the user-activity video signal, the generating performed at least by the stream server and using the backend user interaction data, the user-activity events of interest, a state of the stream server with respect to the user-activity video signal, and a plurality of predefined rules, the new video comprising a plurality of divided segments of the user-activity video signals; and
providing the new video;
wherein the state of the stream server with respect to the user-activity video signal includes initializing, on-going, finished, real-time rebroadcast, retroactive viewing, and editing, and wherein the stream server and the replay server comprise at least one data processor forming part of at least one computing system, and wherein the interface display space comprises a user interface of an online multiplayer video game.

8. The non-transitory computer program product of claim 7, the method further comprising detecting events of interest from the backend user interaction data; and wherein the divided segments of the user-activity video signals correlate in time to the events of interest.

9. The non-transitory computer program product of claim 7, wherein the new video is generated substantially contemporaneously with reception of the user-activity video signal.

10. A system comprising:
a video stream server comprising at least one data processor and memory storing instructions which, when executed by the at least one data processor, causes the at least one data processor to perform operations comprising:
receiving from each of one or more clients a user-activity video signal comprising a video capture characterizing a user's interaction with a software application on the client, the software application having an interface display space on the client and the software application executing on the client in operation with at least one remote backend computing system; and
a replay server comprising at least one data processor and memory storing instructions which, when executed by the at least one data processor, causes the at least one data processor to perform operations comprising:
receiving data characterizing backend user interaction data corresponding to the user's interaction with the software application as generated by the at least one remote backend computing system;
detecting user-activity events of interest; and
generating dynamic commands automatically, the dynamic commands instructing the video stream server to create a new video, the dynamic commands generated at least by using the backend user interaction data, the user-activity events of interest, a state of the video stream server with respect to the user-activity video signal, and a plurality of predefined rules, the new video comprising a plurality of divided segments of the user-activity video signals,
wherein the state of the stream server with respect to the user-activity video signal includes initializing, on-going, finished, real-time rebroadcast, retroactive viewing, and editing, wherein the interface display space comprises a user interface of an online multiplayer video game, and wherein the video stream server creates the new video.

11. The system of claim 10, wherein the new video is a composition of divided segments of video signals from a plurality of clients.

12. The system of claim 10, wherein the replay server is further configured to detect events of interest from the backend user interaction data; and wherein the new video comprises divided segments of the user-activity video signals correlating in time to the events of interest.

13. The system of claim 10, wherein the dynamic commands are generated substantially contemporaneously with reception by the video stream server of the user-activity video signals.

14. The system of claim 10, wherein the dynamic commands specify which divided segments of the user-activity video signals to include in the new video.

15. The system of claim 10, wherein backend user interaction data comprises one or more of: user identification, in-game player information, player history, and in-game player characteristics.

16. The system of claim 10, wherein the video stream server is further configured to store each received user-activity video signal and the new video.

17. The system of claim 10, wherein the video stream server can broadcast to one or more third party destinations the received user-activity video signals as the user-activity video signals are being received by the video stream server.

18. The system of claim 10, wherein each of the user-activity video signals is created at the respective client by one or more of: capturing user interface screen shots at a predetermined rate; capturing open graphics library (openGL) layers; and capturing data through a pixel buffer and forming video data from the captured data.

19. The method of claim 1, wherein the replay server is configured to generate dynamic commands.

20. The non-transitory computer program product of claim 7, wherein the replay server is configured to generate dynamic commands.

21. The system of claim 10, wherein the replay server is configured to generate commands that cause the new video to include the specific user-activity video signal based on a priority.

22. The non-transitory computer program product of claim 7, wherein the state of the stream server is selected from initializing, on-going, finished, real-time rebroadcasting, live, retroactive viewing, and editing.

23. The system of claim 10, wherein the state of the video stream server is selected from initializing, on-going, finished, real-time rebroadcasting, live, retroactive viewing, and editing.

24. The method of claim 1, further comprising generating automatically, by the replay server, commands for instructing the stream server to create the new video.

25. The non-transitory computer program product of claim 7, further comprising generating automatically, by the replay server, commands for instructing the stream server to create the new video.

26. The system of claim 10, wherein the replay server is configured to automatically generate commands for instructing the video stream server to create the new video.

\* \* \* \* \*